United States Patent
Lanzinger

(10) Patent No.: US 9,958,574 B2
(45) Date of Patent: May 1, 2018

(54) HAIL SENSOR

(71) Applicant: DEUTSCHER WETTERDIENST, Offenbach (DE)

(72) Inventor: Eckhard Lanzinger, Hamburg (DE)

(73) Assignee: DEUTSCHER WETTERDIENST, Offenbach (DE)

( * ) Notice: Subject to any disclaimer, the term of this patent is extended or adjusted under 35 U.S.C. 154(b) by 115 days.

(21) Appl. No.: 15/116,270

(22) PCT Filed: Feb. 6, 2015

(86) PCT No.: PCT/EP2015/052563
§ 371 (c)(1),
(2) Date: Aug. 3, 2016

(87) PCT Pub. No.: WO2015/118133
PCT Pub. Date: Aug. 13, 2015

(65) Prior Publication Data
US 2017/0017015 A1    Jan. 19, 2017

(30) Foreign Application Priority Data
Feb. 7, 2014    (EP) .................................... 14154393

(51) Int. Cl.
*G01W 1/14*    (2006.01)
(52) U.S. Cl.
CPC ..................... *G01W 1/14* (2013.01)
(58) Field of Classification Search
CPC .................. G01W 1/14; H01L 41/08
See application file for complete search history.

(56) References Cited

U.S. PATENT DOCUMENTS

| | | | | |
|---|---|---|---|---|
| 4,904,894 A | * | 2/1990 | Henry | G01W 1/14 310/324 |
| 2005/0206526 A1 | * | 9/2005 | Ozawa | G01K 11/3206 340/580 |
| 2012/0029823 A1 | * | 2/2012 | Brillhart | G01W 1/14 702/3 |

FOREIGN PATENT DOCUMENTS

| | | |
|---|---|---|
| CN | 87211200 U | 7/1988 |
| CN | 105655958 A * | 6/2016 |
| DE | 103 30 128 A1 | 1/2005 |
| EP | 0 422 553 A1 | 4/1991 |
| FR | 2 595 473 A1 | 9/1987 |
| WO | 03/027720 A1 | 4/2003 |
| WO | 2013/147605 A2 | 10/2013 |

* cited by examiner

*Primary Examiner* — Francis Gray
(74) *Attorney, Agent, or Firm* — Ware, Fressola, Maguire & Barber LLP

(57) ABSTRACT

The invention relates to a hail sensor having an impact surface, on which precipitation can impinge, and at least one converter, which is arranged and formed in such a way that, in the event of a deflection of the impact surface as a result of precipitation striking the impact surface, the converter outputs a corresponding converter output signal. The impact surface is formed from wires or wire sections, cords or cord sections, or the like which are guided at at least approximately equal distances from one another and do not cross, which are each assigned a converter and which are arranged in such a way that, between the wires, cords, or the like, there is a distance through which liquid precipitation can easily pass after striking the impact surface.

16 Claims, 2 Drawing Sheets

HAIL SENSOR

CROSS REFERENCE TO RELATED APPLICATIONS

This application is the U.S. National Stage of International Application Number PCT/EP2015/052563 filed on Feb. 6, 2015, which application claims priority under 35 USC § 119 to European Patent Application No. 14154393.4 filed on Feb. 7, 2014. Both applications are hereby incorporated by reference in their entirety.

TECHNICAL FIELD

The invention relates to a hail sensor having an impact surface, on which precipitation can impinge, and at least one converter, which is arranged and formed in such a way that, in the event of a deflection of the impact surface as a result of precipitation striking the impact surface, said converter outputs a corresponding converter output signal.

BACKGROUND OF THE INVENTION

Precipitation sensors having an impact surface and a converter for the registration of oscillations produced when precipitation particles strike the impact surface are in principle known and described, for example, in DE 103 30 129 A1, EP 0 422 553 A1, FR. 2 595 473, WO 03/027720 A1 or WO 2013/147605 A2. In such precipitation sensors, a precipitation particle striking the impact surface deflects the impact surface and typically sets the latter oscillating. A deflection of the impact surface can be detected by means of an appropriate converter, which supplies a corresponding converter output signal. By means of evaluating the converter output signal, it is possible to determine whether a precipitation particle has struck the impact surface. This can be done, for example, by using an analysis of the amplitude of the converter output signal.

In such precipitation sensors, there is regularly the desire to differentiate different types of precipitation, for example rain, snow or hail, from one another. In particular, there is the desire to detect precipitation in the form of hail and to distinguish the same reliably from all other types of precipitation, for example in the form of rain. However, this is not simple.

SUMMARY OF THE INVENTION

The invention is based on the object of devising a hail sensor which is able to detect precipitation in the form of hail as reliably and simply as possible.

According to the invention, this object is achieved by a hail sensor of the type mentioned at the beginning in which the impact surface is formed from wires or wire sections, cords or cord sections or the like which are guided in a parallel manner at at least approximately equal distances from one another and do not cross, which are each assigned a converter. In this case, between the wires, cords or the like, there is a distance through which liquid precipitation can easily pass after striking the impact surface.

An impact surface of this type is deflected far less by liquid precipitation than by solid precipitation, since water droplets striking the impact surface are "cut up" by the wires, cords or the like, so that in the event of liquid precipitation striking an impact surface according to the invention, barely any transfer of momentum takes place, and therefore the impact surface is also virtually not deflected and excited to oscillate. Hailstones, on the other hand, strike the impact surface according to the invention in a similar way to conventional, closed impact surfaces and deflect the impact surface accordingly as a result of the transfer of momentum. Here, as a result of the approximately parallel arrangement of the wires or wire sections, cords or cord sections or the like, the impact surface overall has the same detection probability for the precipitation of a respective type and size. This results in a converter output signal which differs from a converter output signal when, for example, rain or snow strikes the impact surface and, above all, in an easily detectable manner. In addition, all other meteorological influencing variables, in particular wind, cannot lead to a noticeable deflection of the impact surface. Therefore the tail sensor according to the invention permits unambiguous detection of hail as a result of a reliable and simple differentiation of precipitation in the form of hail from other precipitation. The hail sensor according to the invention is therefore suitable as a reliable hail detector and hail sensor.

The distance (and therefore the clear space) between the wires or wire sections, cords or cord sections or the like forming the impact surface is between 1 mm and 5 mm and is therefore somewhat smaller than the diameter of typical hailstones which, by definition, is at least 5 mm. Such hailstones therefore cannot pass through the impact surface according to the invention without any transfer of momentum.

The wires or wire sections, cords or cord sections or the like forming the impact surface preferably have a diameter of at most 1 mm, so that they are deflected only a little or even not at all by impinging liquid precipitation. The maximum deflection of the wires or wire sections, cords or cord sections or the like forming the impact surface is additionally set via their mechanical tension.

In order to avoid an undesired accumulation of hailstones on the impact surface, the latter can be arranged slightly obliquely, in order that the hailstones can roll off. The accumulation of show on the impact surface is barely possible in the case of the parallel-stretched wires or wire sections, cords or cord sections or the like, which are less than 1 mm thick. The wires or wire sections forming the impact surface can also be heatable. Thus, an accumulation of snow or formation of white frost can reliably be prevented by heating the wires or wire sections by means of an applied DC voltage.

The converter preferably has a oil or a piezoelectric element and is arranged and formed to detect an oscillation of at least one of the wires or wire section, cords or cord section or the like forming the impact surface and then accordingly to output a converter output signal.

The use of a coil as a converter has the advantage that the acoustic signals from the surroundings are not detected, and therefore interference with the measurement, in particular by environmental noises of natural or artificial origin, cannot take place. When a piezoelectric element is used, care must be taken that acoustic signals from the environment are not coupled into the measured signal.

The wires or wire sections, cords or cord sections or the like forming the impact surface are preferably metal wires, which are formed from an individual filament (and therefore designated as a wire) or else can be formed from a plurality of metal filaments and therefore designated as cords. However, the cords can in principle also consist of one or more materials.

In the case of an impact surface which is formed from a plurality of wires or wire sections, cords or cord sections or the like guided parallel to one another, these wire or cord sections can also be sections of an individual wire or cord guided to and fro, in a way similar, for example, in the case of cords forming the stringing of a tennis racket. Here, the individual wire or the individual cord is stretched over a frame. This is advantageous in particular when the impact surface is formed so as to be heatable, since then a DC voltage has to be applied only to the individual wire stretched over the frame, which, for example, can facilitate simple repair. In addition, the integrity of the impact surface can be monitored by monitoring the current.

Preferably, the at least one converter is connected to memory unit or an evaluation unit or both, which is used to store or evaluate the converter output signal or both. If the converter is merely connected to a memory for recording the converter output signal, this memory can be read later and the time profile of the converter output signal can be analysed retrospectively. On the other hand, if the converter connected directly to an evaluation unit, the respective converter output signal can also be analysed by the evaluation unit in real time.

The evaluation unit is preferably formed so as to assign time sections of the converter output signal to an impingement of a hailstone. This means that the evaluation unit analyses the converter output signal in order to identify those signal sections which are characteristic of the impingement of a hailstone. Preferably, this is done, for example, by evaluating the amplitude of the converter output signal. If the amplitude exceeds a specific threshold value, for example, this is a indication that transfer of momentum to the impact surface has taken place such as is typical for the impingement of a hailstone. Apart from a simple amplitude criterion, however, the evaluation unit can additionally or alternatively also carry out further forms of signal analysis in order to detect the impingement of a respective hailstone.

It is particularly advantageous if the evaluation unit is formed in such a way that it is not only able to identify the impingement of any desired hailstones but, if possible, also to carry out an assignment of signal sections characteristic of the impingement of hailstones to various hailstone sizes. If the evaluation unit, for example, implements a relatively simple amplitude criterion, then, for example, instead of an individual threshold value for the amplitudes, a plurality of threshold values can be provided, so that the signal sections, therefore the hailstones, can be classified in various categories which correspond to hailstones of different sizes.

BRIEF DESCRIPTION OF THE DRAWINGS

The invention is now to be explained in more detail by using an exemplary embodiment and with reference to the figures. Of the figures.

DETAILED DESCRIPTION

Figure 1:
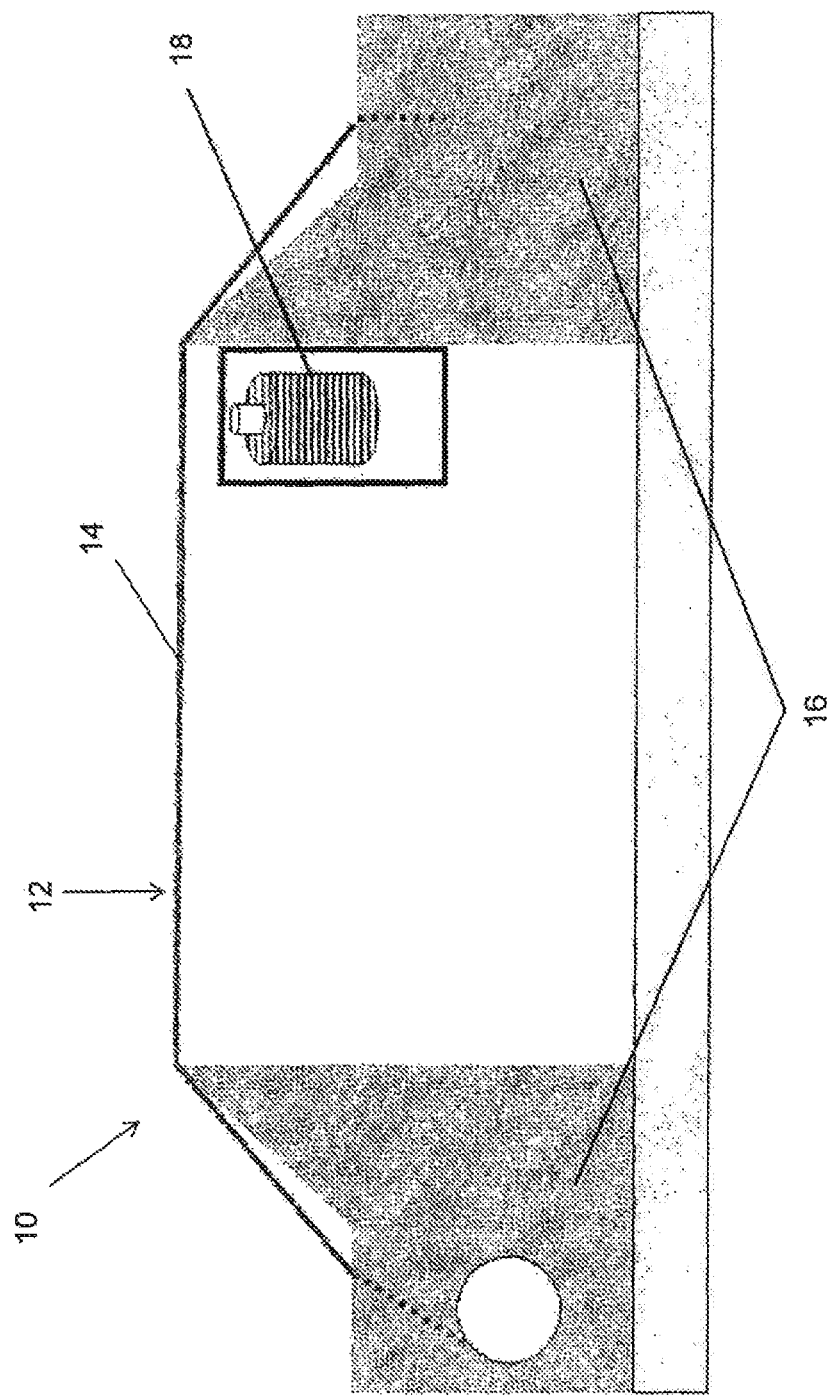
FIG. 1 shows a lateral sectional view of a hail sensor according to the invention.
Figure 2:
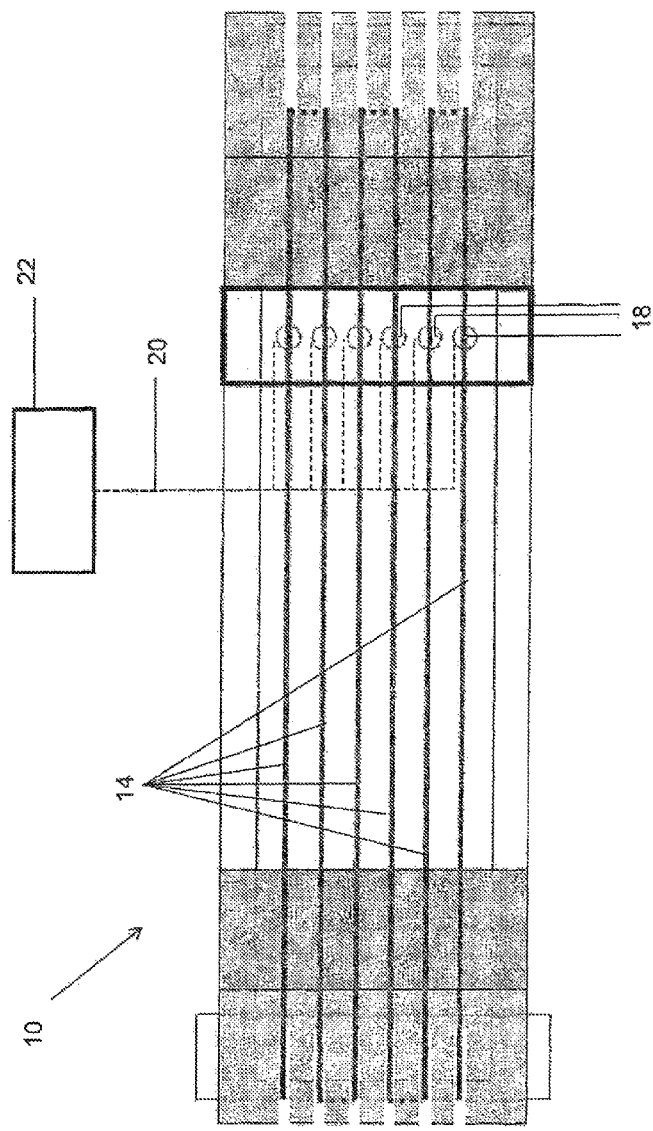
FIG. 2 shows a plan view of the hail sensor according to the invention.

FIGS. 1 and 2 show a hail sensor 10 having an impact surface 12 which is formed from individual wire sections 14 of a wire. The individual wire sections 14 are stretched parallel to one another, in a way similar to the strings of a harp or guitar or the wire sections of an egg cutter, and all have the same and constant distance from one another which, for example, is between 1 mm and 5 mm, preferably about 5 mm. The individual wire sections 14 are wire sections of an individual wire which is stretched over, a frame 16, as can easily be gathered in particular from FIG. 2.

Each wire section 14 is respectively assigned a converter 18, which has a coil by means of which the deflections and oscillations of the wire sections 14 can be detected. The converters 18 each supply a corresponding converter output signal, which is fed via corresponding signal lines 20 to an evaluation unit 22.

The evaluation unit 22 is designed to analyse the converter output signal in order to identify those signal sections which are characteristic of the impingement of a hailstone. The evaluation unit preferably evaluates at least the amplitude of the converter output signal. If the amplitude of the converter output signal exceeds a specific threshold value, for example, this is an indication that a transfer of momentum to the impact surface has taken place with an order of magnitude which is typical for the impingement of a hailstone. In addition to a simple amplitude criterion, however, the evaluation unit can additionally or alternatively also carry out further forms of signal analysis, in order to detect the impact of a respective hailstone and to differentiate the same from the impingement of other objects.

In the exemplary embodiment, the evaluation unit is formed in such a way that it is not only able to identify the impingement of any desired hailstones but can also carry out an assignment of signal sections characteristic of the impingement of hailstones to various hailstone sizes. To this end, the evaluation unit applies a relatively simple amplitude criterion, for example, according to which, instead of a single threshold value for the amplitude, a plurality of threshold values of different heights are provided, corresponding to different-sized deflections of a respective wire section 14 of the impact surface 12, so that the signal sections of the converter output signal and, correspondingly, the hailstones causing a respective deflection of the converter output signal can be classified in various categories which correspond to different-sized hailstones.

In the exemplary embodiment, the wire forming the wire sections 14 is a metal wire having a single element, that is to say a wire in the narrower sense.

Alternatively, a cord with multiple filaments, which preferably consist of metal, could also be provided.

The invention claimed is:
1. A hail sensor comprising:
an impact surface, on which precipitation can impinge, and at least one converter, which is arranged and formed in such a way that, in the event of a deflection of the impact surface as a result of precipitation striking the impact surface, said converter outputs a corresponding converter output signal, characterized in that the impact surface is formed from wires or wire sections, cords or cord sections or the like which are guided in a parallel manner at approximately equal distances from one another and do not cross, which are each assigned a converter, so that, between the wires or wire sections, cords or cord sections or the like, there is a distance through which liquid precipitation can easily pass after striking the impact surface.

2. The hail sensor as claimed in claim 1, wherein the distance between the wires or wire sections, cords or cord sections or the like forming the impact surface is between 1 mm and 5 mm.

3. The hail sensor as claimed in claim 2, wherein the wires or wire sections, cords or cord sections or the like forming the impact surface have a diameter of at most 1 mm.

4. The hail sensor as claimed in claim 3, wherein the wires or wire sections, cords or cord sections or the like forming the impact surface are sections of a single wire or a single cord, wherein the individual wire or the individual cord is stretched over a frame.

5. The hail sensor as claimed in claim 4, wherein the wires or wire sections forming the impact surface are heatable.

6. The hail sensor as claimed in claim 5, wherein the converter has a coil or a piezoelectric element which is arranged and formed to detect a deflection and/or oscillation of at least one of the wires or wire sections, cords or cord section or the like forming the impact surface and to output a corresponding electrical signal.

7. The hail sensor as claimed in claim 6, wherein the at least one converter is connected to a memory unit and/or an evaluation unit for storing and/or evaluating the converter output signal.

8. The hail sensor as claimed in claim 7, wherein the evaluation unit is designed to evaluate an amplitude of the converter output signal in such a way that the evaluation unit assigns time sections of the converter output signal to an impingement of a hailstone.

9. The hail sensor as claimed in claim 8, wherein the evaluation unit is designed to evaluate an amplitude of the converter output signal in such a way that the evaluation unit assigns a respective time section of the converter output signal associated with an impingement of a hailstone to one or more different hailstone sizes.

10. The hail sensor as claimed in claim 1, wherein the wires or wire sections, cords or cord sections or the like forming the impact surface have a diameter of at most 1 mm.

11. The hail sensor as claimed in claim 1, wherein the wires or wire sections, cords or cord sections or the like forming the impact surface are sections of a single wire or a single cord, wherein the individual wire or the individual cord is stretched over a frame.

12. The hail sensor as claimed in claim 1, wherein the wires or wire sections forming the impact surface are heatable.

13. The hail sensor as claimed in claim 1, wherein the converter has a coil or a piezoelectric element which is arranged and formed to detect a deflection and/or oscillation of at least one of the wires or wire sections, cords or cord section or the like forming the impact surface and to output a corresponding electrical signal.

14. The hail sensor as claimed in claim 13, wherein the at least one converter is connected to a memory unit and/or an evaluation unit for storing and/or evaluating the converter output signal.

15. The hail sensor as claimed in claim 14, wherein the evaluation unit is designed to evaluate an amplitude of the converter output signal in such a way that the evaluation unit assigns time sections of the converter output signal to an impingement of a hailstone.

16. The hail sensor as claimed in claim 15, wherein the evaluation unit is designed to evaluate an amplitude of the converter output signal in such a way that the evaluation unit assigns a respective time section of the converter output signal associated with an impingement of a hailstone to one or more different hailstone sizes.

\* \* \* \* \*